United States Patent [19]

Colburn

[11] Patent Number: 4,560,529
[45] Date of Patent: Dec. 24, 1985

[54] FUEL WASHOUT DETECTION SYSTEM

[75] Inventor: Richard P. Colburn, Pasco, Wash.

[73] Assignee: The United States of America as represented by the United States Department of Energy, Washington, D.C.

[21] Appl. No.: 462,852

[22] Filed: Feb. 1, 1983

[51] Int. Cl.$^4$ ............................................. G21C 17/00
[52] U.S. Cl. .................................. 376/251; 376/253; 376/254
[58] Field of Search ............... 376/251, 253, 254, 245; 250/390–392

[56] References Cited

U.S. PATENT DOCUMENTS

| 3,069,339 | 12/1962 | Jacobs | 376/253 |
|---|---|---|---|
| 3,070,532 | 12/1962 | Zebroski | 376/253 |
| 3,178,355 | 4/1965 | Jacobs | 376/253 |
| 3,201,589 | 8/1965 | Kuether | 376/254 |
| 3,444,373 | 5/1969 | Obrowski et al. | 250/390 |
| 3,444,374 | 5/1969 | Kinoshita et al. | 250/390 |
| 3,711,714 | 1/1973 | Klar et al. | 376/254 |
| 3,751,333 | 8/1973 | Drummond et al. | 376/255 |
| 3,780,292 | 12/1973 | Klar | 376/255 |
| 3,802,962 | 4/1974 | Culambourg et al. | 376/254 |
| 3,819,936 | 6/1974 | Weiss et al. | 376/251 |
| 3,819,946 | 6/1974 | Fracke et al. | 376/254 |
| 3,845,311 | 10/1974 | Fujii | 376/254 |
| 3,928,127 | 12/1975 | Hiller | 376/245 |
| 3,940,627 | 2/1976 | Klar | 250/390 |
| 4,140,910 | 2/1979 | Kroon | 250/390 |
| 4,140,911 | 2/1979 | Todt et al. | 376/254 |
| 4,172,760 | 10/1979 | Ballard et al. | 376/245 |

Primary Examiner—Salvatore Cangialosi
Attorney, Agent, or Firm—Edward W. Nypaver; Robert Southworth, III; Judson R. Hightower

[57] ABSTRACT

A system for detecting grossly failed reactor fuel by detection of particulate matter as accumulated on a filter.

5 Claims, 1 Drawing Figure

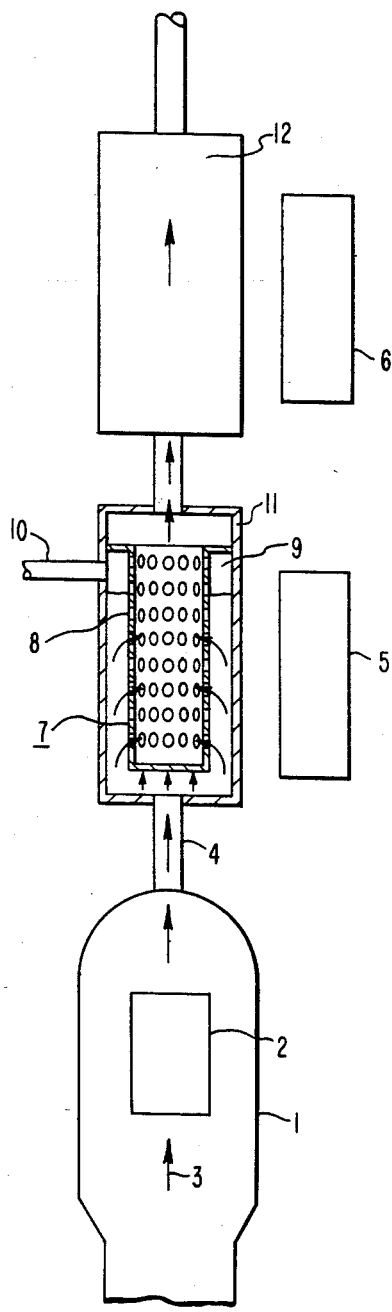

FUEL WASHOUT DETECTION SYSTEM

GOVERNMENT CONTRACT

This invention was conceived during performance of a U.S. Government contract designated DE-AC14-76FF02170.

BACKGROUND OF THE INVENTION

This invention relates to nuclear instrumentation used ot monitor the integrity of fuel rods of nuclear reactor fuel assemblies.

Reference is hereby noted to a copending application entitled "A Device and Process to Differentiate Gross Exposure of Nuclear Fuel from Leaking Fuel Rods" to Kadambi.

Nuclear reactors contain a fuel core which is a grouping of fuel assemblies each of which has a plurality of fuel pins. A fuel rod is a crylindrical tube which contains nuclear fuel pellets. The metal side of the tube separates the fuel pellets from reactor coolant which flows over the surface of the tube or cladding.

A penetration of the cladding termed a fuel failure, may allow fission fragments, particularly gases, to escape from the fuel pin, and may allow coolant/fuel contact.

Nuclear reactors are expected to experience fuel failure in spite of rigorous quality control and conservative operating procedures. Most of the failures result from pin-hole cracks in the cladding and/or end plug welds. Such failures are detected by analysis of fission-gas outside the core (e.g., in the reactor cover gas) and by observation of delayed neutron precursors in the reactor coolant.

The significance of fuel failures arises due to three factors as follows:

(A) Safety: Although failed fuel which only leaks gas is of negligible safety significance, there is concern that the breach in the fuel could become large enough to allow ingress of coolant into the pin, or escape of some fuel particles. In Liquid Metal Fast Breeder Reactors, sodium reaction with fuel material generates a product which is less dense than fuel, causing an increase in volume and sometimes an increase in the breach size. The safety concern from fuel swelling or fuel release occurs because of possible reduced heat transfer from the pin, or the remote possibility that the particles could accumulate to form a heat-generating flow blockage within the core.

(B) Plant Maintenance: Some of the fuel material entering the coolant could be transported away from the core and deposited in any part of the piping, heat exchangers or the pumps. Such deposits could complicate maintenance operations in and around the components.

(C) Economics: Due to the inevitability of fuel failures, the availability of the reactor is significantly improved by operating with a limited number of failed elements. Thus, if the safety and maintenance concerns can be resolved, there is considerable incentive to operate with failed fuel.

One of the problems faced by reactor instrumentation is to detect and monitor failed fuel in such a manner that safe operation of the reactor is not impaired. This problem can be solved by having the ability to observe changes in failed fuel so that significant increases in exposure of fuel to coolant are clearly and reliably annunciated. Relatively isolated and random cladding failure in nuclear fuel is innocuous. If fuel exposure and fuel release occurs, a possible mode of propagation of the failure may be postulated, although certain experience indicates that cladding failures remain localized events. Analyses indicate that small heat generating blockages can be tolerated without jeopardizing safety. If such a blockage can be reliably detected, reactor safety can be further assured by precluding growth of a blockage beyond tolerable limits.

Consequently, it is desired to provide a method for the detection of fuel failure, such method being capable of differentiating between gross failures and small leaks which result in only fission gas leakage.

SUMMARY OF THE INVENTION

Two delayed neutron detectors are positioned near a side stream of reactor coolant flow taken after passage of the coolant through the nuclear fuel core. A filter is located in the coolant stream opposite the upstream detector. The signals from the two detectors are similar when only delayed neutron emitting fission products are in solution in the coolant, but when particulates containing the D.N. emitters are also present due to washout of this material due to gross fuel failure, the particulates are retained by the filter in the field of view of the upstream detector and a significant signal difference between the two detectors occurs thereby indicating gross fuel failure, termed fuel washout.

BRIEF DESCRIPTION OF THE DRAWINGS

FIG. 1 is a schematic of the invented device.

DETAILED DESCRIPTION OF THE INVENTION

Refer to FIG. 1 which shows a nuclear reactor having a nuclear core 2 through which a coolant flow 3 passes. A portion of this flow is diverted at point 4 from the main coolant stream and is caused to pass two delayed neutron detectors 5 and 6. Upstream detector 5 is opposite a filter 7 while downstream detector 6 is opposite a region of coolant flow having no filter.

Particulate matter, considered to be within the coolant only on occurrence of gross fuel failure, will be retained on surface 8 of filter 7, causing upstream detector 5 to have a different output than detector 6.

Soluble fission products will generally pass through filter 7.

A volume 9 in filter 7 can be expected to accumulate fission gases and is a convenient site for removal of and obtaining samples of such gas for other purposes. A gas removal line 10 is shown in FIG. 1.

Filter 7 is shown vertically disposed in FIG. 1 since this configuration, along with small filter holes of 10 $\mu m$ diameter, enhances accumulation of gas in volume 9. The coolant wetted filter 7 becomes as blanketed over some of its surface causing gas disengagement from the coolant flow.

As shown in FIG. 1, the bypass coolant may pass through expanded volumes termed stages 11 and 12, which are opposite respective coolants 5 and 6.

A stainless steel filter 7 has been shown to be extremely effective in retaining fuel particulates. A test effluent (5 gpm) was directed through the filter, with nominal pore size 10 $\mu m$. The bulk of the fuel incident on the filter (a few mg) was retained on it. This 5 gpm flow is maintained with approximately 1 psi $\Delta P$.

As the delayed neutron (DN) precursors arrive at the first stage 11, the species in solution will have a transit time through stage 11 equal to the coolant residence time but the fuel particulates will be held in proximity to detector 5 allowing full decay of any DN precursors they may contain. The precursor concentration in the second stage 12 will be reduced by decay during transit from the first and the elimination of that part which was contained in the particulate trapped on filter 7.

If no particulate is present the two stages will have comparable DN signals. If, however the particulates carry even just a small fraction of the DN pecursors, the signal from detector 5 will become substantially greater than detector 6. Comparison of the signals then offers a sensitive measure of fuel washout. The measurement would be especially useful for detecting sudden fuel washout which might be easily missed with conventional DN detection systems.

ANALYSIS

Assume a delayed neutron precursor species is released from the breached pin at the rate N atoms/sec. and is mixed in the coolant flow tream $M_1$ (cm$^3$/sec). Then a sampling flow stream $M_2$ (cm$^3$/sec) takes some fraction $(m^2/m_1)$ $(M_2/M_1)$ of the released atoms to the entrance of the first detector stage 11 with overall delay time $t_0$. In the first detector stage 11 the filter has efficiency E for removing fuel particulates but O efficiency for removing solution species. Assume fraction f of the DN precursors are contained in the particulates. The transit time through stage 11 for species in solution is $t_1$, they are then transported through stage 12 with transit time $t_2$.

Assume transit time between stages is $t_3$.

If $\lambda$ = the decay constant for a given precursor species then the rate which that species of precursor atoms arrive at stage 11 is $$N_1^* = N \frac{M_2}{M_1} e^{-\lambda t_o}$$

The rate of accumulation of precursor in stage 11

$$\frac{dN_1}{dt} = N_1^* - N_1^o - \lambda N_1$$

ps where $N_1$ = atoms of precursor in stage 11
$N_1^o$ = atoms/sec precursor leaving stage 11 at steady state $$\frac{dN_1}{dt} = 0$$

$$\lambda N_1 = N_1^* - N_1^o = N_1^* (1-(1-Ef)e^{-\lambda t_1})$$

Similarly for the second stage 12 at steady state $$\lambda N_2 = N_2^* - N_2^o = N_1^o e^{-\lambda t_3} (1 - e^{-\lambda t_2})$$

Then the ratio of neutron emission rates at the two stages is:

$$\frac{\lambda N_1}{\lambda N_2} = \frac{1 - e^{-\lambda t_1} + Efe^{-\lambda t_1}}{(1 - Ef)e^{-\lambda(t_1+t_3)}(1 - e^{-\lambda t_2})}$$

First Sample Calculation: For half life of 20 sec., $\lambda = 0.03465$ sec$^{-1}$, $t_1 = t_2 = 2$ sec., $t_3 = 1$ sec. For no particulates f=0

$$\frac{\lambda N_1}{\lambda N_2} = e^{(\lambda(t_1+t_3))} = 1.109$$

For this case similar activities result differing only due the decay in transit.

Second Sample Calculation: If 10% of the precursor is continued in particulates and the filter efficiency is 90%, f=0.1 E=0.9

$$\frac{\lambda N_1}{\lambda N_2} = 4.08$$

$$f \leq .5 \ E = .9$$

$$\frac{\lambda N_1}{\lambda N_2} = 14.66$$

This is a large difference, which is indicative of fuel washout.

In the above analysis calculations were given where the ratio of DN signals from the two DN detectors were calculated assuming a 2-second residence time for the coolant in the field of view of each detector. In actual practice, the typical residence time may be closer to 0.2 sec. This reduction in residence time directly increases the relative difference in signals between the two detectors for a given fraction of fuel washout. With careful design, the coolant residence time could probably be reduced to $\leq 0.1$ sec. That would further enhance this distinction.

An analysis which compares the DN signals which would be obtained with and without the filter in place will be used ot illustrate the importance of the filter.

A comparison of the relative DN signals to be expected for a given rate of fuel particle release, with no filter present, with that of recoil from 1 cm$^2$ of fuel surface may be expressed:

$$R_p/R_s = \dot{M}/\lambda \quad (1)$$

where $R_p$ = DN signal due to particles
$R_s$ = DN signal due to precursor recoil from 1 cm$^2$ fuel
M = fuel particle release rate expressed as a fraction of "recoil volume" released sec$^{-1}$ (Recoil Volume $\frac{1}{4}$ $\delta$; $\delta$ = Recoil Length; $\frac{1}{4}\delta \cong 1.5 \times 10^{-4}$cm$^3$/cm$^2$) p0
$\lambda$ = decay constant for DN emission sec$^{-1}$ This expression shows that, for a signal from the particles without a filter, to equal that from a source of 1 cm$^2$, the washout rate must be: $M \cong \lambda$. For the longer lived DN precursor $^{137}$I$\lambda = 0.028$ sec$^{-1}$.

$$\dot{M} \cong (0.028)(1.5 \times 10^{-4} \text{cm}^3) \cong 4.2 \times 10^{-6} \text{ cm}^3/\text{sec}.$$

For $\rho = 10$ gm/cm$^3$, $\dot{M} = 42$ $\mu$gm/sec.

If we compare the DN signal to be expected from a detector with a filter, with that from similar detector without a filter, for a given fuel washout rate:

$$\frac{R_{FP}}{R_P} = \frac{f}{(1 - e^{-\lambda \tau})} \approx \frac{f}{\lambda \tau} \text{ For } \lambda \tau << 1 \quad (2)$$

$R_{FP}$ = DN signal from particles with filter
$R_P$ = DN signal from particles without filter f = filter efficiency (typically $1 > f > 0.8$)

$\tau$ = fluid residence time in view of detector (sec) = $V/\dot{V}$ ($V$ = fluid volume in view of detector; $\dot{V}$ = flow rate past detector)

This equation shows the signal from DN precursors contained in particles will be enhanced by the use of a filter in a way which is inversely proportional to the fluid residence time and the decay constant. This indicates the system should be designed with relatively high coolant flow rate, minimal coolant volume near the detectors and some delay in the time of transport from the core to the detector to enhance the relative importance of the longer lived DN precursors, i.e., (smaller $\lambda$).

For the case of $^{137}$I $\lambda = 0.028$ sec$^{-1}$ and $\tau = 0.1$ sec.

$$\frac{R_{FP}}{R_P} = \frac{f}{(.028)(.1)} = 357 \, (f)$$

fold enhancement in DN signal. Then the mass loss rate which would give a DN signal equal to recoil from 1 cm$^2$ $$\dot{M} = \frac{4.2 \times 10^6 \, cm^3/sec}{357 \, (f)} = \frac{1.17 \times 10^{-8} \, cm^3}{f}$$

$$\text{if } \rho = 10 \, gm/cm^3; \, \dot{M} = \frac{.117 \, \mu gm/sec}{f}$$

A transit time of $\approx$ 30 sec. from the core to the first detector would be adequate for $\overline{\lambda} < 0.028$. This is the approximate transit time anticipated with current designs. While a long transit time to the detectors and short fluid residence time in the vicinity of the detectors does reduce the absolute size of the DN signal, it greatly increases the distinction between signals from precursors in solution from those in particles.

The filter greatly enhances the efficiency of a DN detector for fuel particles relative to the situation without a filter. In addition, since the system will monitor the differential in DN signal from the two detectors in series, any variations in DN signal due to variation in concentration of the precursors in solution will be compensated for and the differential signal should provide an even more sensitive measure of fuel washout than would be possible with only one detector equipped with a filter.

I claim:

1. A system for the detection of failed fuel for nuclear reactors comprising:
    (a) a path for flow of a portion of core coolant therethrough, said path including a first portion and a second portion;
    (b) a first radiation detector being in juxtaposition to said first portion of said path;
    (c) a second radiation detector being in juxtaposition to said second portion of said path, said second portion being downstream of said first portion; and
    (d) a filter contained within said first portion, said filter adapted to retain thereon particulate matter which may be contained by said core coolant, said filter having holes of about 10 $\mu$m in diameter.

2. The system of claim 1 wherein said first and second radiation detectors are delayed neutron detectors.

3. The system of claim 1 wherein said filter is stainless steel.

4. The system of claim 1 wherein said filter is adapted to have a pressure drop of approximately 1 psi.

5. The system of claim 1 wherein said filter is vertically disposed and said first region contains a volume upstream of said filter which volume is adapted to accumulate gases which do not pass through said filter, and said first region has means for disposal of said gases.

* * * * *